US012746835B2

(12) United States Patent
Saha et al.

(10) Patent No.: US 12,746,835 B2
(45) Date of Patent: Sep. 29, 2026

(54) IN-VEHICLE CHARGING DEVICE

(71) Applicant: AISIN CORPORATION, Kariya (JP)

(72) Inventors: Subrata Saha, Kariya (JP); Keisuke Nakamura, Kariya (JP); Shin Taguchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 173 days.

(21) Appl. No.: 18/752,141

(22) Filed: Jun. 24, 2024

(65) Prior Publication Data

US 2025/0038675 A1 Jan. 30, 2025

(30) Foreign Application Priority Data

Jul. 26, 2023 (JP) ................................ 2023-121968

(51) Int. Cl.

| | |
|---|---|
| ***B60L 53/22*** | (2019.01) |
| ***B60L 15/00*** | (2006.01) |
| ***B60L 53/14*** | (2019.01) |
| ***B60L 53/24*** | (2019.01) |
| ***B60L 55/00*** | (2019.01) |
| ***B60L 58/20*** | (2019.01) |

(Continued)

(52) U.S. Cl.

CPC ............ *B60L 53/22* (2019.02); *B60L 15/007* (2013.01); *B60L 53/14* (2019.02); *B60L 53/24* (2019.02); *B60L 55/00* (2019.02); *B60L 58/20* (2019.02); *B60L 58/21* (2019.02); *H02J 7/02* (2013.01); *H02J 7/56* (2026.01)

(58) Field of Classification Search

CPC .. H02J 7/02; H02J 7/56; H02M 1/008; H02M 7/5387; B60L 53/22; B60L 55/00; B60L 53/14; B60L 53/24; B60L 58/21; B60L 58/20; B60L 15/007

See application file for complete search history.

(56) References Cited

U.S. PATENT DOCUMENTS

2008/0013351 A1* 1/2008 Alexander .......... H02M 7/4807 363/123
2018/0034446 A1* 2/2018 Wood .................... H02M 7/217

(Continued)

FOREIGN PATENT DOCUMENTS

JP 2022-503713 A 1/2022
WO 2022135744 A1 6/2022

OTHER PUBLICATIONS

Dec. 19, 2024 Extended European Search Report issued in European Patent Application No. 24182466.3.

*Primary Examiner* — Gary L Laxton
(74) *Attorney, Agent, or Firm* — Oliff PLC

(57) ABSTRACT

An in-vehicle charging device that includes an AC-DC converter that converts power between AC power on the external AC power supply side and first DC power on the first DC power supply side, and converts power between AC power on the external AC power supply side and second DC power on the second DC power supply side, wherein the AC-DC converter is a triple active bridge circuit including: a transformer including a primary-side coil, a secondary-side first coil, and a secondary-side second coil; a primary-side bridge circuit connected to the primary-side coil; a secondary-side first bridge circuit connected to the secondary-side first coil; and a secondary-side second bridge circuit connected to the secondary-side second coil, and the primary-side bridge circuit includes a bidirectional switching device.

2 Claims, 9 Drawing Sheets

(51) Int. Cl.

| | |
|---|---|
| ***B60L 58/21*** | (2019.01) |
| ***H02J 7/02*** | (2016.01) |
| ***H02J 7/56*** | (2026.01) |

(56) References Cited

U.S. PATENT DOCUMENTS

| | | | |
|---|---|---|---|
| 2021/0155100 | A1 | 5/2021 | Khaligh et al. |
| 2022/0021293 | A1 | 1/2022 | Esmoris Bertoa et al. |
| 2022/0021311 | A1 * | 1/2022 | Ishibashi ........... H02M 3/33573 |

* cited by examiner

IN-VEHICLE CHARGING DEVICE

CROSS REFERENCE TO RELATED APPLICATIONS

This application is based on and claims priority under 35 U.S.C. § 119 to Japanese Patent Application No. 2023-121968, filed on Jul. 26, 2023, the entire content of which is incorporated herein by reference.

TECHNICAL FIELD

The present disclosure relates to an in-vehicle charging device.

BACKGROUND DISCUSSION

JP 2022-503713 T discloses an in-vehicle charging device (onboard charger) that charges a direct current (DC) power supply mounted on a vehicle provided with a rotating electrical machine as a driving power source of wheels of an electric vehicle, a hybrid vehicle, or the like in a state where the DC power supply is mounted on the vehicle. FIG. 1 of JP 2022-503713 T illustrates a schematic block diagram of an in-vehicle charging device that charges an in-vehicle DC power supply (140) by receiving power supply from an external alternating current (AC) power supply (110). The in-vehicle charging device includes an AC-DC converter (120) that converts AC power supplied from the external AC power supply into DC power, and a DC-DC converter (130) that transforms the DC power while reducing a pulsation component included in the converted DC power and supplies the transformed DC power to a DC power supply.

FIG. 8 illustrates one form of such an in-vehicle charging device. An AC-DC converter (1) can include an input inductor (Li) and a full-bridge circuit (111). In addition, a DC-DC converter (2) can be configured as a dual active bridge (DAB) circuit including a transformer (T), a full-bridge circuit (211) disposed on a primary side of the transformer (T), and a full-bridge circuit (212) disposed on a secondary side of the transformer (T). The AC-DC converter (1) including the full-bridge circuit (111) also functions as a power factor correction (PFC) circuit that improves the power factor of the DC power converted from the AC power. In addition, the full-bridge circuit (111) is also subjected to switching control so as to suppress pulsation of a second harmonic wave of the frequency of the AC power. The DC-DC converter (2) further reduces the pulsation component of the DC power by the dual active bridge circuit and provides a charging current to the DC power supply (3).

In addition, in an electric vehicle that has been widely used in recent years, a motor that requires a relatively high output (workload) may be mounted in addition to a rotating electrical machine (traction motor) serving as a driving power source of wheels. Examples of the motor include a motor that drives a device (a compressor or the like) constituting an air conditioner that cools and heats the vehicle interior, and a motor that drives a pump that circulates a fluid (for example, oil) for lubricating and cooling a driving device (traction motor, gear mechanism, and the like) of wheels. In order to supply power to these motors, a second DC power supply may be provided in addition to the DC power supply (first DC power supply) connected to the traction motor. As illustrated in FIG. 9, it is preferable that not only the first DC power supply (3) but also a second DC power supply (30) can be charged from the external AC power supply (4).

In the form illustrated in FIG. 8, three full-bridge circuits are provided as the in-vehicle charging device, and a large number of switching devices are required as the entire in-vehicle charging device. As in the form illustrated in FIG. 9, in a case where a plurality of DC power supplies is charged, the number of switching devices further increases. In addition, in recent years, the performance of the chargeable secondary battery has been significantly improved, and there is a possibility that a charging current having a pulsation with a larger amplitude than that in the related art may be allowable during charging. Therefore, there is also a possibility that the need to suppress pulsation generated at the time of power conversion from an AC to a DC will be reduced as compared with the present situation.

A need thus exists for an in-vehicle charging device which is not susceptible to the drawback mentioned above.

SUMMARY

An in-vehicle charging device charges a first direct current (DC) power supply and a second DC power supply electrically isolated from the first DC power supply with power supplied from an external alternating current (AC) power supply. The in-vehicle charging device includes an AC-DC converter that converts power between AC power on the external AC power supply side and first DC power on the first DC power supply side, and converts power between AC power on the external AC power supply side and second DC power on the second DC power supply side, in which the AC-DC converter is a triple active bridge circuit including: a transformer including a primary-side coil, a secondary-side first coil, and a secondary-side second coil; a primary-side bridge circuit connected to the primary-side coil; a secondary-side first bridge circuit connected to the secondary-side first coil; and a secondary-side second bridge circuit connected to the secondary-side second coil, and the primary-side bridge circuit includes a bidirectional switching device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
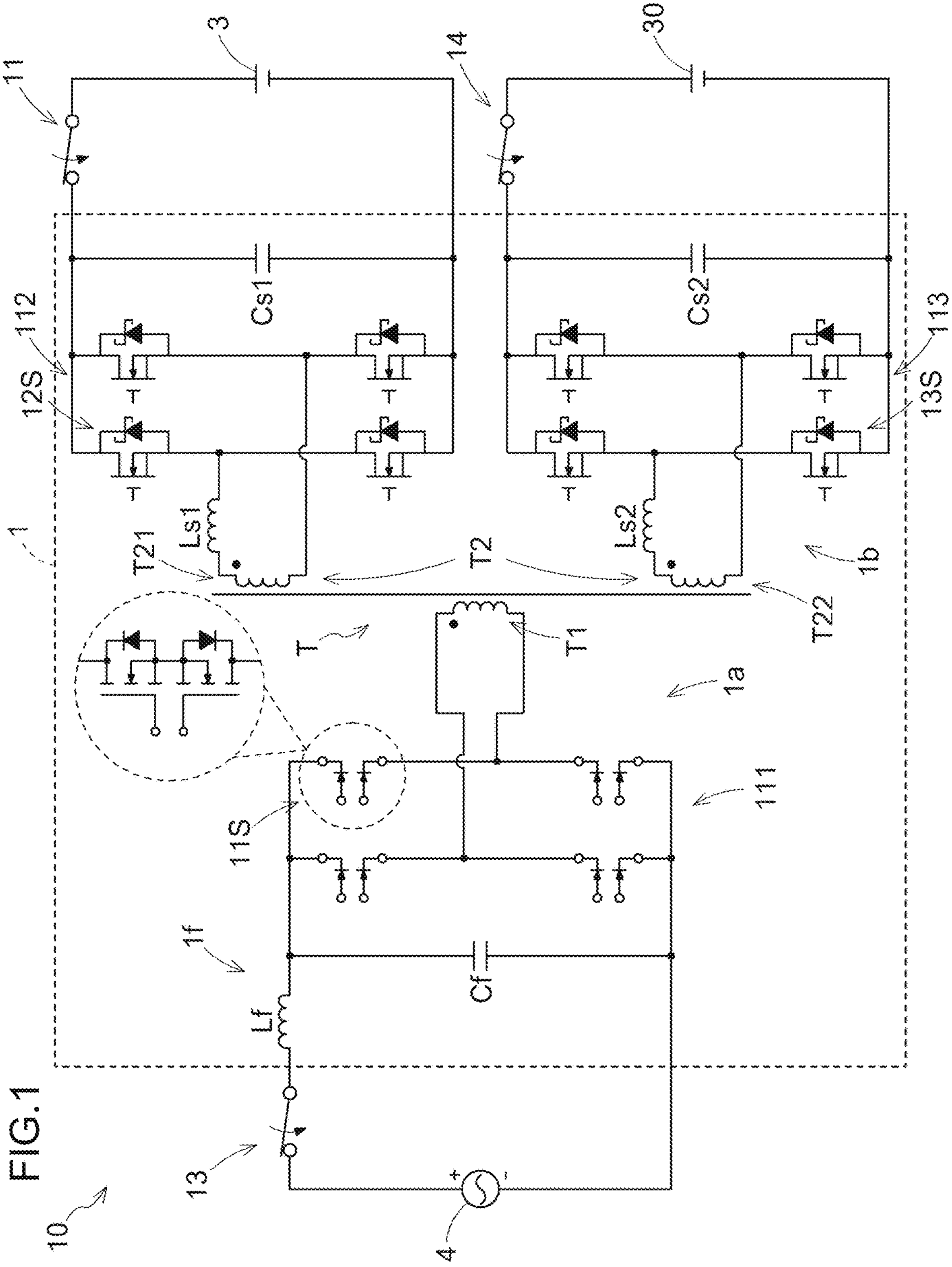
FIG. 1 is a circuit block diagram illustrating a first example of an in-vehicle charging device.

Hereinafter, an embodiment of an in-vehicle charging device will be described with reference to the drawings. The circuit block diagram of FIG. 1 illustrates a first example of an in-vehicle charging device 10. The in-vehicle charging device 10 is a device that charges a first DC power supply 3 and a second DC power supply 30 with power supplied from an external AC power supply 4 in a state where the first DC power supply 3 and the second DC power supply 30 are mounted on the vehicle, and is a device called an on-board charger. In the present embodiment, the first DC power supply 3 and the second DC power supply 30 are DC power supplies that are electrically independent from each other and are isolated from each other. In addition, the in-vehicle charging device 10 is a bidirectional power conversion device, and for example, can convert DC power supplied from the first DC power supply 3 or the second DC power supply 30 into AC power of a commercial frequency and output the AC power. The first DC power supply 3 and the second DC power supply 30 may have different or the same rated voltage, and may have the same or different storage capacity. However, the present embodiment illustrates a form in which the first DC power supply 3 is a so-called high-voltage DC power supply having a rated voltage of about 200 to 400 volts, and the second DC power supply 30 is a so-called low-voltage DC power supply having a rated voltage of about 12 to 50 volts.

The first DC power supply 3 and the second DC power supply 30 include, for example, a rechargeable secondary battery (battery) such as a lithium ion battery, an electric double layer capacitor, and the like. For example, in a case where the rated voltage of the second DC power supply 30 is about 12 to 24 volts, the second DC power supply 30 may be a lead-acid battery.

Although not illustrated, for example, when the first DC power supply 3 or the second DC power supply 30 is a lithium ion battery or the like, a battery management system (BMS) is often provided. A secondary battery such as a lithium ion battery includes a plurality of cells (battery cells). The battery management system is a battery management control system that performs (1) prevention of overcharge and overdischarge of a cell, (2) prevention of overcurrent from flowing through a cell, (3) temperature management of a cell, (4) calculation of a state of charge (SOC), (5) equalization of a cell voltage, and the like. As will be described later with reference to FIG. 7, in a case where a battery current sensor 31 and a battery voltage sensor 32 are provided, these sensors may be configured as a part of the battery management system.

The in-vehicle charging device 10 and the first DC power supply 3 are configured to be able to connect and disconnect electrical connection by a first main contactor 11, and the in-vehicle charging device 10 and the second DC power supply 30 are configured to be able to connect and disconnect electrical connection by a second main contactor 14. In addition, the in-vehicle charging device 10 and the external AC power supply 4 are configured to be able to connect and disconnect electrical connection by a grid contactor 13. The first main contactor 11, the second main contactor 14, and the grid contactor 13 are, for example, relays. The relay may be a mechanical relay or a semiconductor relay (solid state relay). The same applies to other contactors described later.

As illustrated in FIG. 1, the in-vehicle charging device 10 includes an AC-DC converter 1 that converts power between AC power on the external AC power supply 4 side and first DC power on the first DC power supply 3 side, and converts power between AC power on the external AC power supply 4 side and second DC power on the second DC power supply 30 side. An LC filter circuit 1*f* including a filter inductor Lf and a filter capacitor Cf is provided in a connection portion of the AC-DC converter 1 with the external AC power supply 4 (between a primary-side bridge circuit 111 to be described later and the external AC power supply 4). Note that this does not hinder the form without the LC filter circuit 1*f*.

The AC-DC converter 1 includes a transformer T including a primary-side coil T1 and a secondary-side coil T2. The secondary-side coil T2 includes a secondary-side first coil T21 and a secondary-side second coil T22. A primary-side circuit 1*a* including the primary-side coil T1 is formed on the primary side of the transformer T. On the secondary side of the transformer T, a secondary-side circuit 1*b* including the secondary-side first coil T21 and the secondary-side second coil T22 is formed. The primary-side circuit 1*a* includes a primary-side bridge circuit 111 connected to the primary-side coil T1, and an LC filter circuit 1*f*. The secondary-side circuit 1*b* includes a secondary-side first bridge circuit 112 connected to the secondary-side first coil T21, a secondary-side second bridge circuit 113 connected to the secondary-side second coil T22, a secondary-side first inductor Ls1 disposed between the secondary-side first coil T21 and the secondary-side first bridge circuit 112, and a secondary-side second inductor Ls2 disposed between the secondary-side second coil T22 and the secondary-side second bridge circuit 113. That is, the AC-DC converter 1 is a triple active bridge (TAB) circuit including the transformer T including the primary-side coil T1, the secondary-side first coil T21, and a secondary-side second coil T22, the primary-side bridge circuit 111 connected to the primary-side coil T1, the secondary-side first bridge circuit 112 connected to the secondary-side first coil T21, and the secondary-side second bridge circuit 113 connected to the secondary-side second coil T22.

A first output capacitor Cs1 is disposed on the side opposite to the secondary-side first coil T21 in the secondary-side first bridge circuit 112. When the first main contactor 11 is closed, the first output capacitor Cs1 is connected in parallel to the first DC power supply 3, and functions as a smoothing capacitor that smooths an output voltage from the AC-DC converter 1 (secondary-side first bridge circuit 112). Pulsation of a harmonic component of the frequency of the external AC power supply 4 may be superimposed on the voltage output from the AC-DC converter 1, and the first output capacitor Cs1 reduces the amplitude of the pulsation component. Similarly, a second output capacitor Cs2 is disposed on the side opposite to the secondary-side second coil T22 in the secondary-side second bridge circuit 113. When the second main contactor 14 is closed, the second output capacitor Cs2 is connected in parallel to the second DC power supply 30, and functions as a smoothing capacitor that smooths an output voltage from the AC-DC converter 1 (secondary-side second bridge circuit 113).

In the present embodiment, a switching device 11S included in the primary-side bridge circuit 111 is a bidirectional switching device. That is, the primary-side bridge circuit 111 includes a bidirectional switching device. The bidirectional switching device is an element capable of causing a current to flow bidirectionally, and has a withstand voltage equivalent to a voltage having both positive and negative polarities with respect to the element. Therefore, it is easy to construct a current control type AC-DC converter using an inductor (filter inductor Lf) as the primary-side circuit 1*a* in the AC-DC converter 1. This inductor acts to cause a constant current to flow. A voltage control type AC-DC converter requires a large-capacity capacitor. However, by using a current control type AC-DC converter, a large-capacity capacitor is unnecessary, and the component cost can be reduced and an increase in size of the device can be suppressed. Note that the filter capacitor Cf is a small-capacity capacitor. In addition, the bidirectional switching device easily realizes soft switching accompanied by zero current switching in which a current flowing through the switching device is zero at the time of switching. Therefore, the loss of the in-vehicle charging device 10 can be easily reduced, and the system cost can be easily reduced.

Note that the switching device 12S included in the secondary-side first bridge circuit 112 and the switching device 13S included in the secondary-side second bridge circuit 113 need not be bidirectional switching devices. The present embodiment exemplifies a field effect transistor (FET) as the switching device 12S and the switching device 13S. A freewheel diode is connected in parallel to each switching device with a direction from the negative electrode to the positive electrode (direction from the lower-stage side to the upper-stage side) as a forward direction. As a matter of course, when a body diode is used or when reverse conduction in a wide bandgap semiconductor transistor made of enhanced mode gallium nitride (E-GaN) is used, the freewheel diode of such a form may not be provided.

In the present embodiment, since the AC-DC converter 1 includes the transformer T, it is possible to ensure insulation between the external AC power supply 4 and the first DC power supply 3, between the external AC power supply 4 and the second DC power supply 30, and between the first DC power supply 3 and the second DC power supply 30. In a case where the external AC power supply 4 is not electrically independent of the first DC power supply 3 and the second DC power supply 30, the ground is common, so that a relatively high leakage current may flow to the ground. Since there is a possibility that a user is present in the vicinity of the vehicle during charging of the first DC power supply 3 and the second DC power supply 30, it is preferable to consider such a leakage current. In addition, in the configuration in which the external AC power supply 4 is not electrically independent of the first DC power supply 3 and the second DC power supply 30, when a short-circuit failure or the like occurs in the external AC power supply 4, a large short-circuit current may flow through the first DC power supply 3 and the second DC power supply 30, and further through the in-vehicle device connected to the first DC power supply 3 and the in-vehicle device connected to the second DC power supply 30. Since the in-vehicle charging device 10 of the present embodiment includes the dual active bridge circuit using the transformer T, the external AC power supply 4 is isolated from the first DC power supply 3 and the second DC power supply 30. Therefore, it is easy to ensure the safety of the user during charging of the first DC power supply 3 and the second DC power supply 30, and it is also possible to suppress the influence of the short-circuit failure of the external AC power supply 4 on the vehicle during charging of the first DC power supply 3 and the second DC power supply 30.

Figure 2:
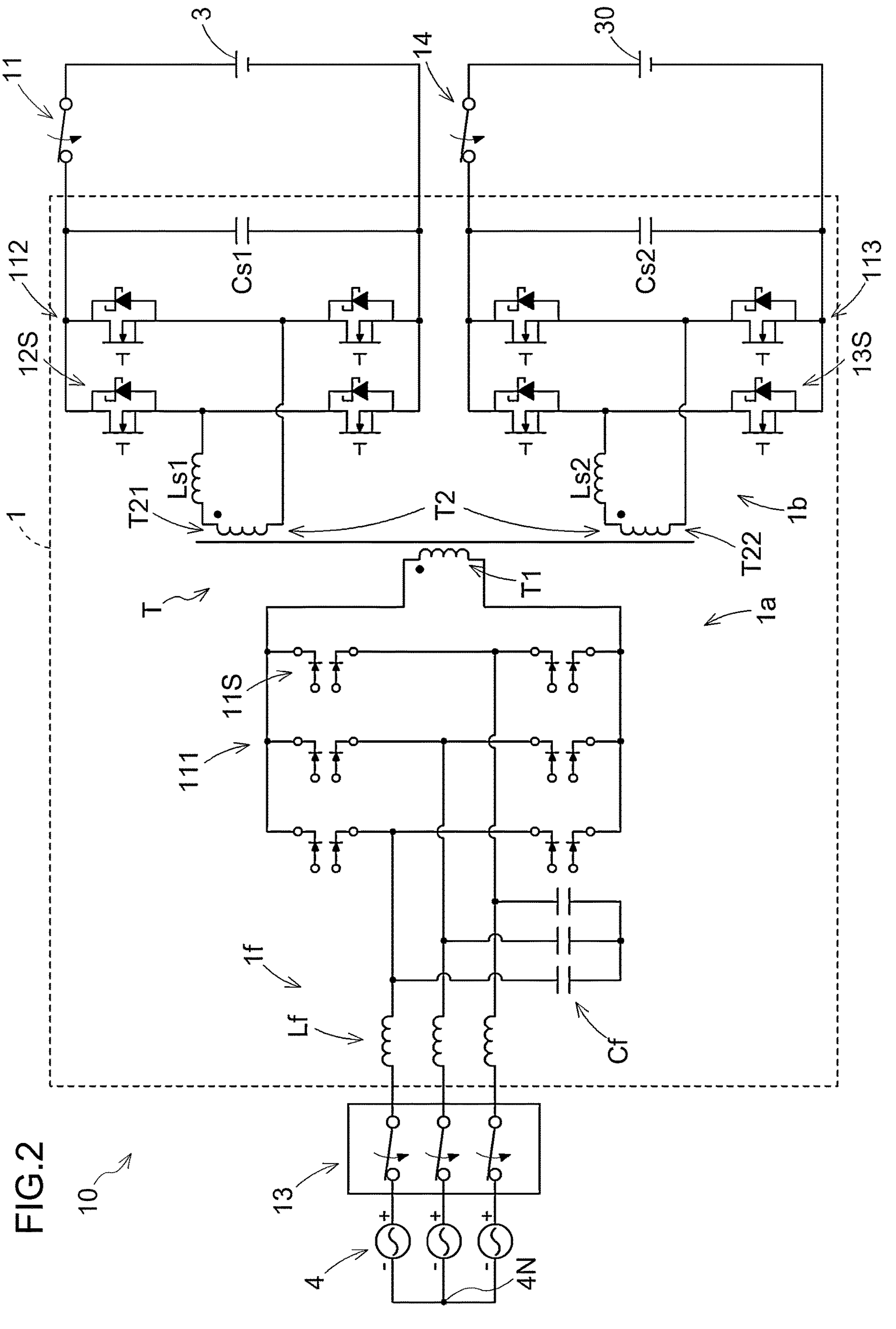
FIG. 2 is a circuit block diagram illustrating a second example of the in-vehicle charging device.

The circuit block diagram of FIG. 2 illustrates a second example of the in-vehicle charging device 10. In the first example, the external AC power supply 4 is a single-phase AC power supply, whereas in the second example, the external AC power supply 4 is an AC power supply of multiple phases. Here, a form is exemplified in which the external AC power supply 4 is connected at a neutral point 4N, and is constituted by three AC power supplies having phases different from each other by $2\pi/3$. Corresponding to the three AC power supplies, the grid contactor 13 also includes three contacts.

The primary-side circuit 1*a* of the second example is configured as a three-phase AC-DC converter in order to convert power from a three-phase AC to a DC. The primary-side bridge circuit 111 includes three arms corresponding to the respective three phases. Also in the second example, the primary-side bridge circuit 111 is configured using a bidirectional switching device. The filter inductor Lf and the filter capacitor Cf are connected to the connection point of the switching device 11S in the arm of each phase to form the LC filter circuit 1*f*. Other configurations are similar to those of the first example, and thus detailed description thereof is omitted.

Figure 3:
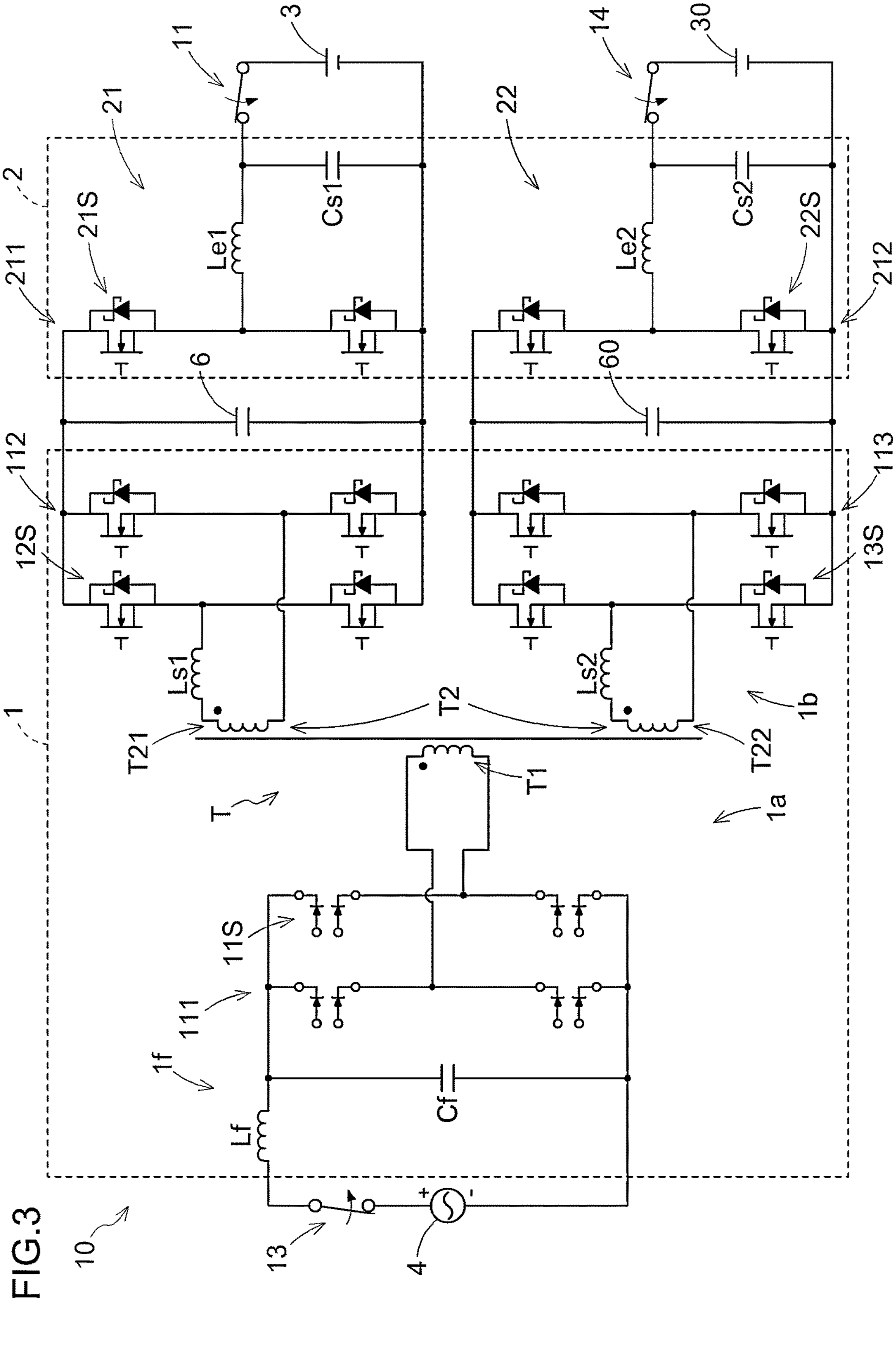
FIG. 3 is a circuit block diagram illustrating a third example of the in-vehicle charging device.

The circuit block diagram of FIG. 3 illustrates a third example of the in-vehicle charging device 10. Compared to the first example, the in-vehicle charging device 10 of the third example further includes a DC-DC converter 2 in addition to the AC-DC converter 1. In recent years, the performance of the chargeable secondary battery has been significantly improved, and there is a possibility that a current having a pulsation with a larger amplitude than that in the related art may be allowed to flow into the secondary battery during charging. However, when a cheaper secondary battery is used as the first DC power supply 3 and the second DC power supply 30, it is sometimes preferable to consider the amplitude of the pulsation component. Therefore, in the third example, the DC-DC converter 2 is provided, so that the pulsation of the charging voltage (battery voltage) applied from the in-vehicle charging device 10 to the first DC power supply 3 and the second DC power supply 30 and the charging current (battery current) supplied from the first DC power supply 3 and the second DC power supply 30 can be further reduced as compared with the first example.

Since the configurations of the AC-DC converter 1 are the same in the first example and the third example, a detailed description thereof will be omitted. The DC-DC converter 2 includes a first chopper circuit 21 that converts first DC power into third DC power and a second chopper circuit 22 that converts second DC power into fourth DC power. The first DC power supply 3 is charged with the third DC power, and the second DC power supply 30 is charged with the fourth DC power. The first output capacitor Cs1 that is disposed between the AC-DC converter 1 and the first DC power supply 3 and functions as a smoothing capacitor in the first example is disposed between the DC-DC converter 2 and the first DC power supply 3 as an output capacitor of the DC-DC converter 2. Similarly, the second output capacitor Cs2 is also disposed between the DC-DC converter 2 and the second DC power supply 30 as an output capacitor of the DC-DC converter 2. Note that a first DC link capacitor 6 that smooths a DC voltage (DC link voltage) between the AC-DC converter 1 and the DC-DC converter 2 (first chopper circuit 21) is disposed at a portion (DC side of the AC-DC converter 1) where the first output capacitor Cs1 is disposed in the first example. Similarly, a second DC link capacitor 60 that smooths a DC voltage (DC link voltage) between the AC-DC converter 1 and the DC-DC converter 2 (second chopper circuit 22) is disposed at a portion (DC side of the AC-DC converter 1) where the second output capacitor Cs2 is disposed in the first example.

The first chopper circuit 21 is configured as a bust chopper including a first switching circuit 211, a first choke coil Le1, and the first output capacitor Cs1, and converts first DC power into third DC power. The second chopper circuit 22 is configured as a buck chopper including a second switching circuit 212, a second choke coil Le2, and the second output capacitor Cs2, and converts second DC power into fourth DC power.

The first switching circuit 211 has a half-bridge configuration including one arm in which the switching devices 21S are connected in series on the upper-stage side and the lower-stage side. One end of the first choke coil Le1 is connected to a midpoint of the arm, that is, a connection point between the switching device 21S on the upper-stage side and the switching device 21S on the lower-stage side. The other end of the first choke coil Le1 is connected to a positive electrode-side terminal of the first output capacitor Cs1. The first output capacitor Cs1 is connected in parallel to the first DC power supply 3 in a state where the first main contactor 11 is closed.

Similarly, the second switching circuit 212 has a half-bridge configuration including one arm in which the switching devices 22S are connected in series on the upper-stage side and the lower-stage side. One end of the second choke coil Le2 is connected to a midpoint of the arm, that is, a connection point between the switching device 22S on the upper-stage side and the switching device 22S on the lower-stage side. The other end of the second choke coil Le2 is connected to a positive electrode-side terminal of the second output capacitor Cs2. The second output capacitor Cs2 is connected in parallel to the second DC power supply 30 in a state where the second main contactor 14 is closed.

According to the third example, even if pulsation of harmonic components of the frequency of the external AC power supply 4 remains in the first DC power and the second DC power, the harmonic components can be reduced by the first chopper circuit 21 and the second chopper circuit 22.

Meanwhile, an AC rotating electrical machine (traction motor) is mounted as a driving power source of wheels in an electric vehicle or a hybrid vehicle that has been widely used in recent years. In addition, unlike an automobile in which a conventional internal combustion engine is used as a driving power source of wheels, auxiliary machines such as an oil pump and a compressor of an air conditioner, which have been conventionally driven using the driving power of the internal combustion engine in an electric vehicle and a hybrid vehicle, are also often driven by another AC rotating electrical machine (auxiliary machine motor). Unlike a vehicle to which electric power is supplied from an overhead line like a railway, in an automobile, the AC rotating electrical machine is driven by AC power supplied from a DC power supply such as a battery mounted on the vehicle via an inverter. The AC rotating electrical machine includes coils of multiple phases for generating a rotating magnetic field. In addition, the inverter that converts power between a DC and an AC is configured as a bridge circuit using a switching device. When a DC power supply that supplies power to the rotating electrical machine is charged by receiving power supply from an external AC power supply, the vehicle is stopped (parked), and thus, coils of the rotating electrical machine and an inverter that drives the rotating electrical machine are not used to drive the rotating electrical machine. Therefore, by using coils of a rotating electrical machine or an inverter for driving the rotating electrical machine for the in-vehicle charging device 10, it is possible to suppress an increase in system cost due to mounting of the in-vehicle charging device 10 on a vehicle.

Figure 4:
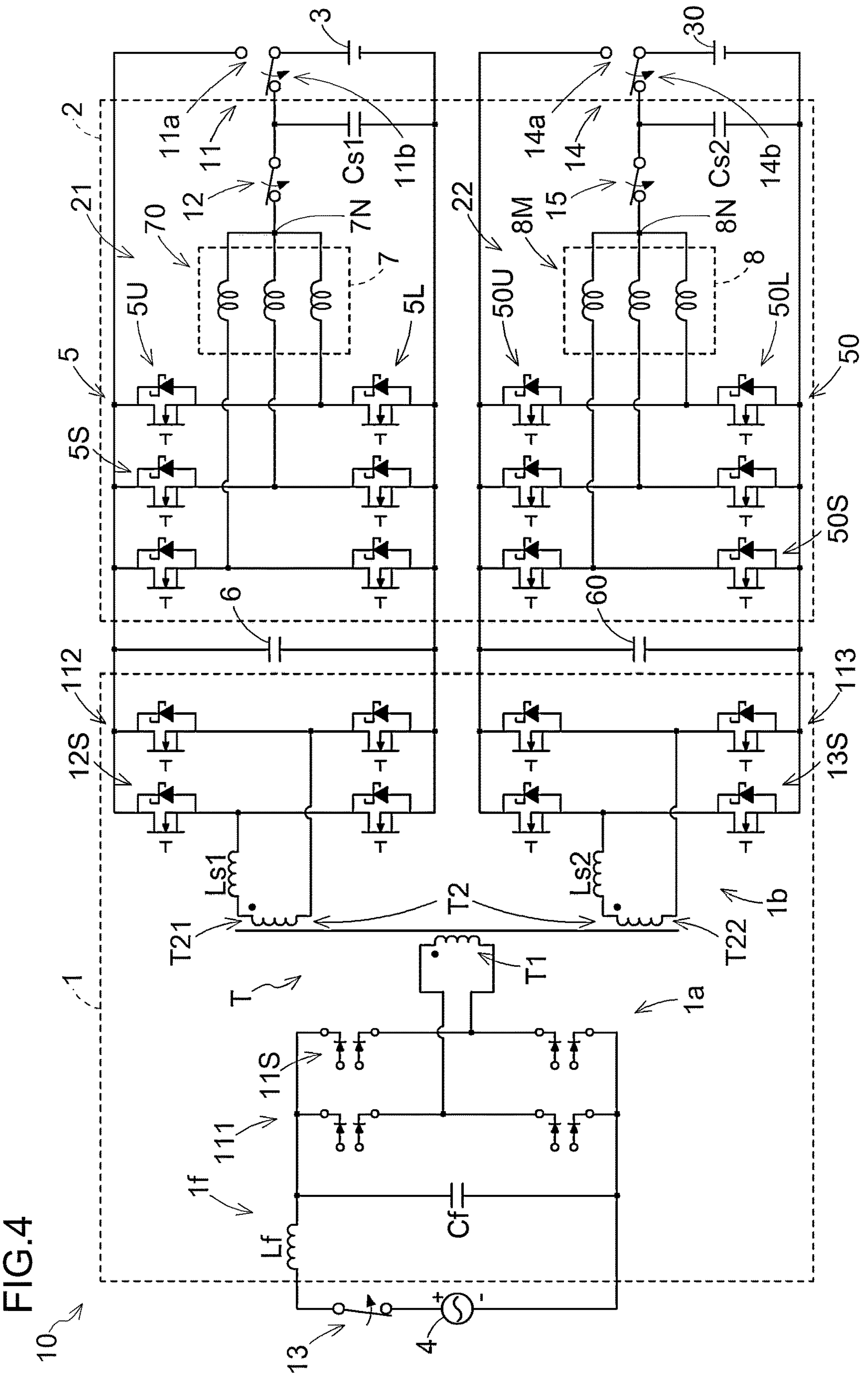
FIG. 4 is a circuit block diagram illustrating a fourth example of the in-vehicle charging device (one example of the in-vehicle charging device using a drive control system of a rotating electrical machine in the third example)

The circuit block diagram of FIG. 4 is one example of the in-vehicle charging device 10 using the drive control system of the rotating electrical machine, and illustrates a fourth example of the in-vehicle charging device 10. As is clear from the comparison between FIGS. 3 and 4, the first switching circuit 211 in the first chopper circuit 21 is configured using a first inverter 5 to be described later. In addition, the first choke coil Le1 in the first chopper circuit 21 is configured using first stator coils 7 of a first rotating electrical machine 70 to be described later. The first output capacitor Cs1 is connected to a neutral point 7N of the first stator coils 7. Similarly, the second switching circuit 212 in the second chopper circuit 22 is configured using a second inverter 50 to be described later. In addition, the second choke coil Le2 in the second chopper circuit 22 is configured using second stator coils 8 of a second rotating electrical machine 8M to be described later. The second output capacitor Cs2 is connected to a neutral point 8N of the second stator coils 8.

As described above, the rotating electrical machine mounted on a vehicle is not limited to a traction motor that drives wheels, and may be a motor that drives a compressor of an air conditioner, a motor that drives an electric oil pump, a motor that drives an electric water pump for circulating cooling water, or the like. Here, the term "motor" is used because the term "drive" is focused on, but the term "motor" and the term "rotating electrical machine" are synonymous. Since the in-vehicle air conditioner and the electric oil pump are referred to as an auxiliary machine with respect to the vehicle driving device 9 as a main machine, in the following description, a motor serving as a driving power source of wheels may be referred to as a traction motor, and a motor serving as a driving power source of the in-vehicle air conditioner and the electric oil pump may be referred to as an auxiliary machine motor serving as a driving power source of the auxiliary machine. The first rotating electrical machine 70 described above corresponds to a traction motor. The second rotating electrical machine 8M corresponds to an auxiliary machine motor.

Figure 7:
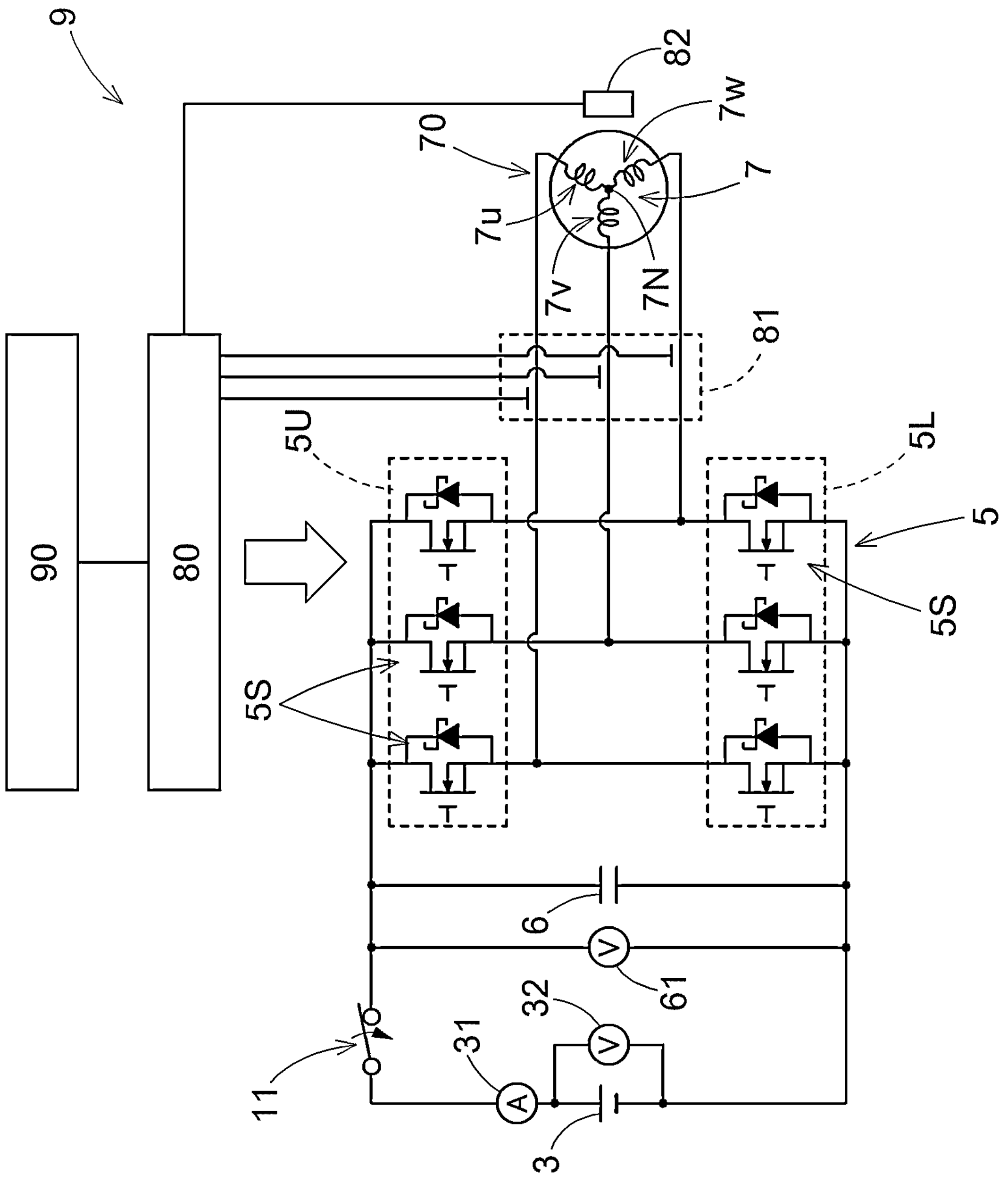
FIG. 7 is a schematic circuit block diagram of a drive control system of a first rotating electrical machine.
Figure 8:
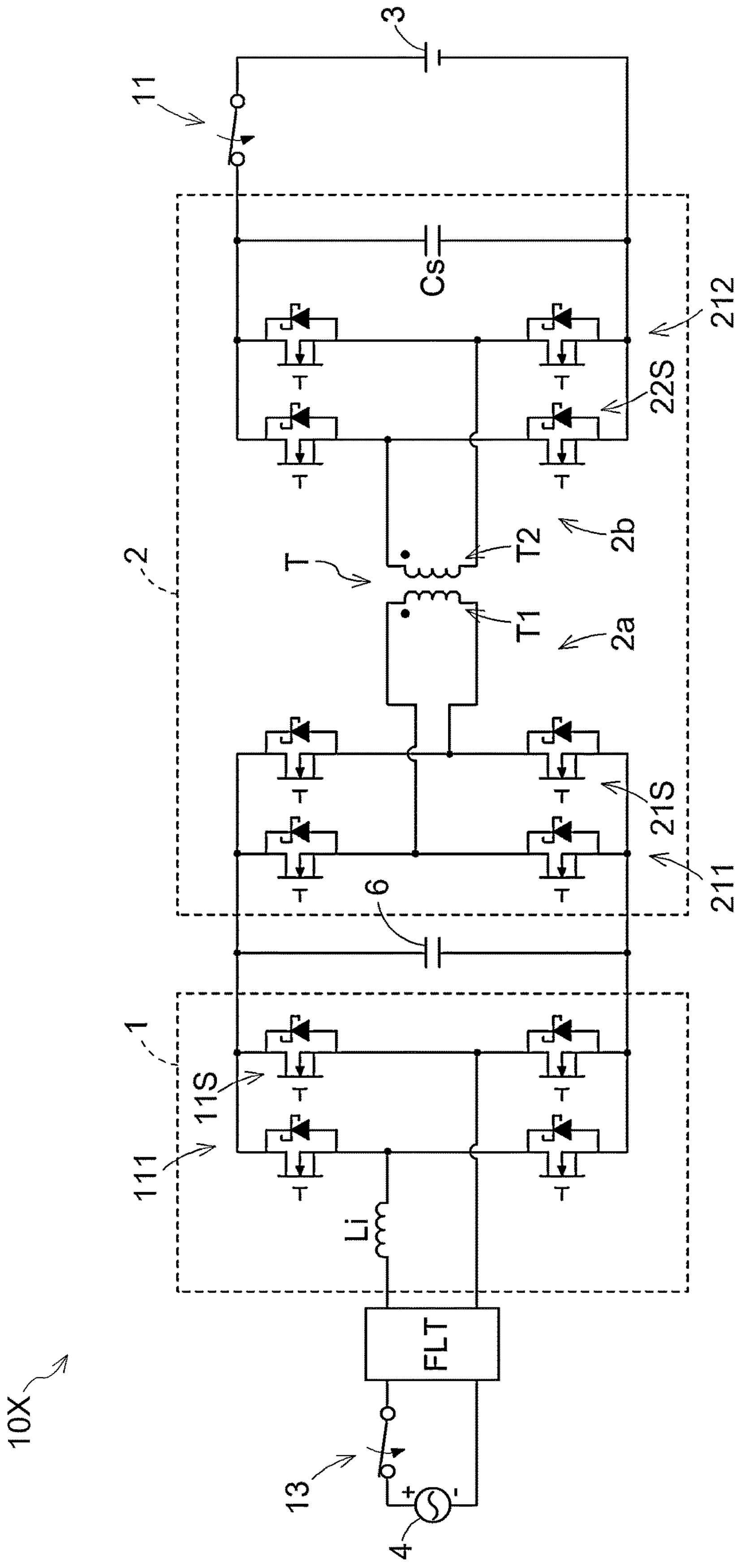
FIG. 8 is a circuit block diagram illustrating one example of a conventional in-vehicle charging device.
Figure 9:
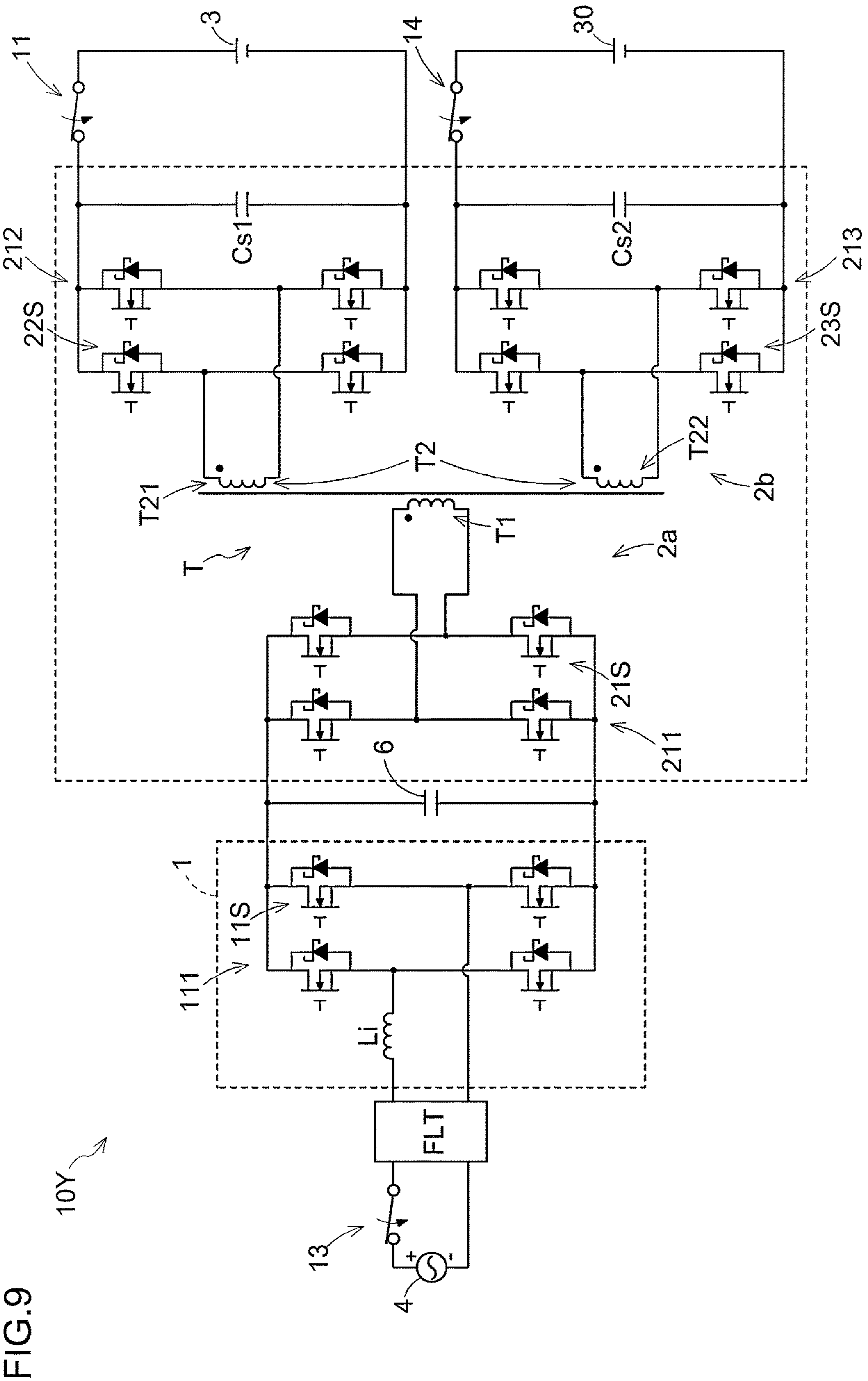
FIG. 9 is a circuit block diagram illustrating another example of the conventional in-vehicle charging device.

Here, a drive control system of a rotating electrical machine will be described. The schematic circuit block diagram of FIG. 7 illustrates one example of a drive control system of the first rotating electrical machine 70. Since the drive control system of the second rotating electrical machine 8M can be easily understood from the description of the drive control system of the first rotating electrical machine 70, here, the drive control system of the first rotating electrical machine 70 will be described as a representative example, and the description of the drive control system of the second rotating electrical machine 8M will be omitted.

As illustrated in FIG. 7, the vehicle driving device 9 includes the first rotating electrical machine 70 that serves as a driving power source for wheels of a hybrid vehicle, an electric vehicle, or the like, and the first inverter 5 that is connected to the first rotating electrical machine 70 and the first DC power supply 3 and converts power between a DC and an AC of multiple phases (here, three phases). Note that the vehicle driving device 9 is not prevented from including other driving power sources such as an internal combustion engine (not illustrated) in addition to the first rotating electrical machine 70.

As illustrated in FIG. 7, the vehicle driving device 9 includes a control device 80 that controls a first rotating electrical machine 70 serving as a driving power source of the vehicle, and the control device 80 performs current feedback control to perform drive control of the first rotating electrical machine 70. The first rotating electrical machine 70 to be driven is an interior permanent magnet synchronous motor (IPMSM) including a stator in which first stator coils 7 of multiple phases (N phases where N is any natural number; a three-phase form where N=3 is exemplified in the present embodiment) are disposed, and a rotor in which a permanent magnet is disposed in a rotor core. Such a configuration is known, and illustration of the stator core, the stator, the rotor core, the rotor, the permanent magnet, and the like is omitted in the present embodiment. In the present embodiment, a Y-type (star type) form in which the first stator coils 7 of three phases are short-circuited at the neutral point 7N is illustrated. However, the first rotating electrical machine 70 may be in a form including, for example, two sets of first stator coils 7 of three phases, and driven by an AC of six phases. Note that the first rotating electrical machine 70 can function as both an electric motor and a generator. When the first rotating electrical machine 70 functions as an electric motor, the first rotating electrical machine 70 is in a powering state, and when the first rotating electrical machine 70 functions as a generator, the first rotating electrical machine 70 is in a regeneration state.

The first inverter 5 is connected to the first AC rotating electrical machine 70 and the first DC power supply 3 to convert power between an AC and a DC of multiple phases. A pair of DC side terminals of the first inverter 5 is connected to a positive electrode terminal and a negative electrode terminal of the first DC power supply 3. In addition, the AC-side terminals of multiple phases of the first inverter 5 are connected to the respective first stator coils 7 of multiple phases. In the present embodiment, the first inverter 5 includes a U-phase arm, a V-phase arm, and a W-phase arm as arms of multiple phases. Each of the arms is formed by connecting an upper-stage side switching device 5U disposed on the positive electrode side and a lower-stage side switching device 5L disposed on the negative electrode side in series. A midpoint of each arm, that is, a connection point between the upper-stage side switching device 5U and the lower-stage side switching device 5L is connected to the corresponding first stator coil 7. Specifically, the midpoint of the U-phase arm and a U-phase coil 7*u* are connected, the midpoint of the V-phase arm and a V-phase coil 7*v* are connected, and the midpoint of the W-phase arm and a W-phase coil 7*w* are connected.

A smoothing capacitor (first DC link capacitor 6) that smooths a voltage (DC link voltage) between the positive electrode and the negative electrode is provided on the DC side of the first inverter 5. In addition, a voltage sensor (DC link voltage sensor 61) that detects the DC link voltage is also provided on the DC side of the first inverter 5.

The first inverter 5 includes a plurality of switching devices 5S. The present embodiment exemplifies a form in which an FET is used as the switching device 5S. In addition to the FET, an insulated gate bipolar transistor (IGBT) may be used for the switching device 5S.

The first inverter 5 is controlled by the control device 80. The control device 80 is constructed using a logic circuit such as a microcomputer as a core member. For example, the control device 80 drives the first rotating electrical machine 70 via the first inverter 5 by performing current feedback control on the basis of a target torque (torque command) of the first rotating electrical machine 70 provided as a request signal from another control device such as a vehicle control device 90 which is one of host control devices. Note that an operating voltage of a logic circuit element such as a microcomputer is generally 5 volts or less. In the present embodiment, a control signal generated by the logic circuit element is transmitted to the first inverter 5 via a drive circuit, which is not illustrated for simplicity. Alternatively, it may be considered that the control device 80 includes a drive circuit.

Actual currents flowing through the first stator coils 7 of respective phases of the first rotating electrical machine 70 are detected by a current sensor (motor current sensor 81), and the control device 80 acquires the detection result. The magnetic pole position (electrical angle) and the rotational speed (angular velocity) of the rotor of the first rotating electrical machine 70 at each time point are detected by a rotation sensor 82 such as, for example, a resolver or an inductive position sensor, and the control device 80 acquires the detection result. The control device 80 executes current feedback control using the detection results of the motor current sensor 81 and the rotation sensor 82. The control device 80 includes various functional units for current feedback control, and each functional unit is realized by cooperation of hardware such as a microcomputer and software (program).

As described above, the first rotating electrical machine 70 connected to the first DC power supply 3 via the first inverter 5 functions as an electric motor by the power supplied from the first DC power supply 3, and can also function as a generator to charge the first DC power supply 3. For example, in a hybrid vehicle, mechanical energy can be supplied to the first rotating electrical machine 70 by power of an internal combustion engine or the like to cause the first rotating electrical machine 70 to generate power, but there are few opportunities for power generation, and the first DC power supply 3 cannot be sufficiently charged in some cases. In addition, in an electric vehicle in which only the first rotating electrical machine 70 is mounted as a driving power source, power generation is limited to that by mechanical energy from wheels in inertial traveling or the like, and the first DC power supply 3 cannot be sufficiently charged in many cases. In the hybrid vehicle, sometimes the energy efficiency is better when the electric power is supplied from the outside than when the electric power is generated by the first rotating electrical machine 70. For this reason, it is preferable that the first DC power supply 3 can be charged by an external power supply in a state where the first DC power supply 3 is mounted on the vehicle.

In a case where the first DC power supply 3 is charged by the external AC power supply 4, the in-vehicle charging device 10 is preferably mounted on the vehicle as in the present embodiment. As described above with reference to the first example to the third example, the in-vehicle charging device 10 including the power conversion circuit tends to have a large circuit scale, but the opportunity to charge the first DC power supply 3 is smaller than the opportunity to drive the wheels. When the first DC power supply 3 is charged by the external AC power supply 4, the vehicle is stopped (parked). In the fourth example, the in-vehicle charging device 10 is configured using the first inverter 5 and the first stator coils 7.

As described above, the in-vehicle charging device 10 of the present embodiment is configured to be able to charge the first DC power supply 3 and the second DC power supply 30. In addition, the first rotating electrical machine 70 and the first inverter 5 are isolated from the primary-side circuit 1*a* of the AC-DC converter 1 by the transformer T. Similarly, the second rotating electrical machine 8M and the second inverter 50 are isolated from the primary-side circuit 1*a* of the AC-DC converter 1 by the transformer T. On the other hand, the first rotating electrical machine 70 and the first inverter 5 are connected to the first DC power supply 3 connected to the first chopper circuit 21, and the second rotating electrical machine 8M and the second inverter 50 are connected to the second DC power supply 30 connected to the second chopper circuit 22. In other words, the first DC power supply 3 is connected to the first rotating electrical machine 70 including the first stator coils 7 of multiple phases connected to each other at the neutral point 7N via the first inverter 5 that converts power between a DC and an AC. In addition, the second DC power supply 30 is connected to the second rotating electrical machine 8M including the second stator coils 8 of multiple phases connected to each other at the neutral point 8N via the second inverter 50 that converts power between a DC and an AC.

Therefore, in the fourth example, the first chopper circuit 21 is configured using the first inverter 5 and the first stator coils 7, and the second chopper circuit 22 is configured using the second inverter 50 and the second stator coils 8. Specifically, the first chopper circuit 21 includes a first switching circuit configured using the first inverter 5, a first choke coil configured using the first stator coils 7 of multiple phases, and the first output capacitor Cs1 connected to the neutral point 7N of the first stator coils 7 of multiple phases. In addition, the second chopper circuit 22 includes a second switching circuit configured using the second inverter 50, a second choke coil configured using the second stator coils 8 of multiple phases, and the second output capacitor Cs2 connected to the neutral point 8N of the second stator coils 8 of multiple phases.

The first inverter 5 includes arms for one phase in which the upper-stage side switching device 5U and the lower-stage side switching device 5L are connected in series, the number of which corresponds to the number of AC phases of multiple phases (here, three corresponding to three phases), in parallel. Similarly, the second inverter 50 includes arms for one phase in which an upper-stage side switching device 50U and a lower-stage side switching device 50L are connected in series, the number of which corresponds to the number of AC phases of multiple phases (here, three corresponding to three phases), in parallel. When the first inverter 5 functions as the switching circuit of the first chopper circuit 21, all the upper-stage side switching devices 5U of the arms of multiple phases are simultaneously controlled to be turned on and off in the same manner, and all the lower-stage side switching devices 5L of the arms of multiple phases are simultaneously controlled to be turned on and off in the same manner. Therefore, the first inverter 5 having a plurality of arms apparently functions as the first switching circuit 211 including one arm in which the upper-stage side switching device 5U and the lower-stage side switching device 5L are connected in series. The second inverter 50 also apparently functions as the second switching circuit 212 including one arm in which the upper-stage side switching device 50U and the lower-stage side switching device 50L are connected in series.

One end of each of the first stator coil 7 and the second stator coil 8 of each phase of multiple phases is connected to the midpoint of the arm corresponding to each phase, and the other end is connected to the neutral point 7N and the neutral point 8N. As described above, since the arms of multiple phases are similarly subjected to the switching control, the current similarly flows through the first stator coil 7 of each phase between the arm and the neutral point 7N, and the current similarly flows through the second stator coil 8 of each phase between the arm and the neutral point 8N. Therefore, the first stator coils 7 of multiple phases can be regarded as one coil, and the first stator coils 7 function as the first choke coil Le1 in which one-end side is connected to the midpoint of the switching circuit and the other end side is connected to the output capacitor Cs in the chopper circuit. Similarly, the second stator coils 8 of multiple phases can be regarded as one coil, and function as the second choke coil Le2.

As illustrated in FIG. 4, the in-vehicle charging device 10 of the fourth example includes, in addition to the first main contactor 11, the second main contactor 14, and the grid contactor 13, a first function switching contactor 12 and a second function switching contactor 15 for switching between a control function of the rotating electrical machine and a charging function of the DC power supply. These contactors are controlled by the control device 80, the control device 80 and the vehicle control device 90, or a control device (not illustrated) that controls the second rotating electrical machine 8M in addition to these devices. Note that the contactors of the first to third examples are similarly controlled by the vehicle control device 90 and a control device (not illustrated) that controls the in-vehicle charging device 10. As described above with reference to FIG. 7, the control device 80 and the vehicle control device 90 are also included in the drive control system of the rotating electrical machine, and it can be said that the control device 80, the vehicle control device 90, and a control device (not illustrated) that controls the second rotating electrical machine 8M are also shared by the drive control of the rotating electrical machine and the charge control by the in-vehicle charging device 10. As is apparent from FIGS. 3, 4, and 7, the first DC link capacitor 6 and the second DC link capacitor 60 can also be shared by drive control of the rotating electrical machine and charge control by the in-vehicle charging device 10.

As described above with reference to FIG. 7, the first main contactor 11 is installed so as to be able to connect and disconnect electrical connection between the first DC power supply 3 and the first inverter 5. In a case where the first inverter 5 and the first stator coils 7 of the first rotating electrical machine 70 are also used as the in-vehicle charging device 10, the connection form to the first DC power supply 3 is switched. Therefore, the first main contactor 11 includes a first main contactor first contact 11*a* and a first main contactor second contact 11*b*. When the first inverter 5 functions as the vehicle driving device 9, the first main contactor first contact 11*a* is closed and the first main contactor second contact 11*b* is opened. When the first inverter 5 functions as the in-vehicle charging device 10, the first main contactor second contact 11*b* is closed and the first main contactor first contact 11*a* is opened. When the vehicle is parked without charging the first DC power supply 3, both the first main contactor first contact 11*a* and the first main contactor second contact 11*b* are brought into the open state, whereby the first main contactor 11 can be brought into the open state.

The first function switching contactor 12 electrically connects the output of the first chopper circuit 21 as the DC-DC converter 2 and the first DC power supply 3 in the closed state. Specifically, the first function switching contactor 12 connects the neutral point 7N and the positive electrode of the first DC power supply 3 in the closed state, and connects the positive electrode side terminal of the first output capacitor Cs1 and the positive electrode of the first DC power supply 3. As described above, the grid contactor 13 disconnects the electrical connection between the AC-DC converter 1 and the external AC power supply 4.

When the first inverter 5 is used for drive control of the first rotating electrical machine 70, the first main contactor first contact 11*a* is closed, and the first function switching contactor 12 and the grid contactor 13 are controlled to be in an open state, and power is converted between the first DC power supply 3 and the first rotating electrical machine 70 via the first inverter 5. When the first inverter 5 is used as the in-vehicle charging device 10, the first main contactor second contact 11*b* is closed, the first function switching contactor 12 and the grid contactor 13 are controlled to be in a closed state, and the first DC power supply 3 is charged by the external AC power supply 4.

As illustrated in FIG. 4, the second main contactor 14 is installed so as to be able to connect and disconnect electrical connection between the second DC power supply 30 and the second inverter 50. When the second inverter 50 and the second stator coils 8 of the second rotating electrical machine 8M are also used as the in-vehicle charging device 10, the connection form to the second DC power supply 30 is switched. Therefore, the second main contactor 14 includes a second main contactor first contact 14*a* and a second main contactor second contact 14*b*. When the second inverter 50 functions as the vehicle driving device 9, the second main contactor first contact 14*a* is closed and the second main contactor second contact 14*b* is opened. When the second inverter 50 functions as the in-vehicle charging device 10, the second main contactor second contact 14*b* is closed and the second main contactor first contact 14*a* is opened. When the second DC power supply 30 is not charged and, for example, the main switch (ignition switch) of the vehicle is in the off state and the auxiliary machine is also stopped, both the second main contactor first contact 14*a* and the second main contactor second contact 14*b* are brought into the open state, so that the second main contactor 14 can be brought into the open state.

The second function switching contactor 15 electrically connects the output of the second chopper circuit 22 as the DC-DC converter 2 and the second DC power supply 30 in the closed state. Specifically, the second function switching contactor 15 connects the neutral point 8N and the positive electrode of the second DC power supply 30 in the closed state, and connects the positive electrode side terminal of the second output capacitor Cs2 and the positive electrode of the second DC power supply 30. As described above, the grid contactor 13 disconnects the electrical connection between the AC-DC converter 1 and the external AC power supply 4.

When the second inverter 50 is used for drive control of the second rotating electrical machine 8M, the second main contactor first contact 14*a* is closed, and the second function switching contactor 15 and the grid contactor 13 are controlled to be in an open state, and power is converted between the second DC power supply 30 and the second rotating electrical machine 8M via the second inverter 50. When the second inverter 50 is used as the in-vehicle charging device 10, the second main contactor second contact 14*b* is closed, the second function switching contactor 15 and the grid contactor 13 are controlled to be in a closed state, and the second DC power supply 30 is charged by the external AC power supply 4.

Thus, it is possible to realize a circuit capable of switching between the function of driving and controlling the rotating electrical machine and the function of charging the DC power supply with the external AC power supply 4 only by changing the connection form to the inverter and the stator coils. That is, a DC power supply connected to the rotating electrical machine can be charged by using both coils included in the rotating electrical machine and an inverter for driving and controlling the rotating electrical machine. By using both of the coils and the inverter, the in-vehicle charging device 10 can be configured on a small scale.

Note that the second DC power supply 30 can also be charged with power supplied from the first DC power supply 3 or the first rotating electrical machine 70. For example, in a state where the external AC power supply 4 is not connected and the first DC power supply 3 is not charged (the grid contactor 13 and the first function switching contactor 12 are in an open state), the first main contactor first contact 11*a* is closed with respect to the first DC power supply 3, and the second main contactor second contact 14*b* and the second function switching contactor 15 are closed with respect to the second DC power supply 30. In this state, the first rotating electrical machine 70 performs powering operation with the power supplied from the first DC power supply 3, or when the first rotating electrical machine 70 includes wheels, an internal combustion engine, or the like, performs regenerative operation by generating power with the motive power transmitted from the internal combustion engine, and supplies power to the first DC power supply 3.

The secondary-side first bridge circuit 112 of the AC-DC converter 1 is connected to the DC side of the first DC link capacitor 6, the first DC power supply 3, and the first inverter 5. Power from the first DC link capacitor 6, the first DC power supply 3, and the first inverter 5 can be transmitted to the secondary-side second coil T22 via the secondary-side first coil T21 to which the secondary-side first bridge circuit 112 is connected and the primary-side coil T1. The secondary-side second coil T22 is connected to the secondary-side second bridge circuit 113, and the secondary-side second bridge circuit 113 is connected to the second DC link capacitor 60 and the second chopper circuit 22. The power supplied from the secondary-side second bridge circuit 113 is supplied to the second DC power supply 30 via the second chopper circuit 22 as described above.

In a case where the second rotating electrical machine 8M is an auxiliary machine motor for an air conditioner, in a state where the air conditioner is not used, the second DC power supply 30 can be charged by the power (including both power supplied from the first DC power supply 3 and power regenerated in the first DC power supply 3) of the first DC power supply 3 without connecting the external AC power supply 4 as described above. Here, the auxiliary machine motor for the air conditioner has been exemplified, but the same applies to a case where the second rotating electrical machine 8M is another auxiliary machine motor.

In addition, here, a form in which the second DC power supply 30 is charged by the power of the first DC power supply 3 in the in-vehicle charging device 10 illustrated in FIG. 4 has been described. However, also in the in-vehicle charging device 10 illustrated in FIGS. 1 to 3 that does not use a rotating electrical machine, the second DC power supply 30 can be charged by the power of the first DC power supply 3 (in this case, power supplied from the first DC power supply 3) without connecting the external AC power supply 4. Since the open/close state of the contactor and the flow of power are as described above with reference to FIG. 4, detailed description thereof will be omitted.

In the present embodiment, since the form in which the first DC power supply 3 is a high-voltage DC power supply and the second DC power supply 30 is a low-voltage DC power supply is taken as an example, the form in which the second DC power supply 30 is charged by the power of the first DC power supply 3 has been exemplified. However, as described above, the first DC power supply 3 and the second DC power supply 30 may have the same rated voltage or the same storage capacity. Further, this does not hinder the first rotating electrical machine 70 and the second rotating electrical machine 8M being, for example, running motors (2-motor automobile, open winding type rotating electrical machine including two sets of inverters, and the like) or auxiliary machine motors. Therefore, the present disclosure is not limited to a form in which the second DC power supply 30 is charged with the power of the first DC power supply 3, and a form in which the first DC power supply 3 is charged with the power of the second DC power supply 30 may be adopted. As a matter of course, switching may be possible between the case of charging the second DC power supply 30 with the power of the first DC power supply 3 and the case of charging the first DC power supply 3 with the power of the second DC power supply 30.

As described above, the second DC power supply 30 can also be charged by the power supplied from the first DC power supply 3 or the first rotating electrical machine 70, and the first DC power supply 3 can also be charged by the power supplied from the second DC power supply 30 or the second rotating electrical machine 8M. Therefore, in the in-vehicle charging device 10, the third example illustrated in FIG. 3 may be configured as the fifth example illustrated in FIG. 5, and the fourth example illustrated in FIG. 4 may be configured as the sixth example illustrated in FIG. 6.

Figure 5:
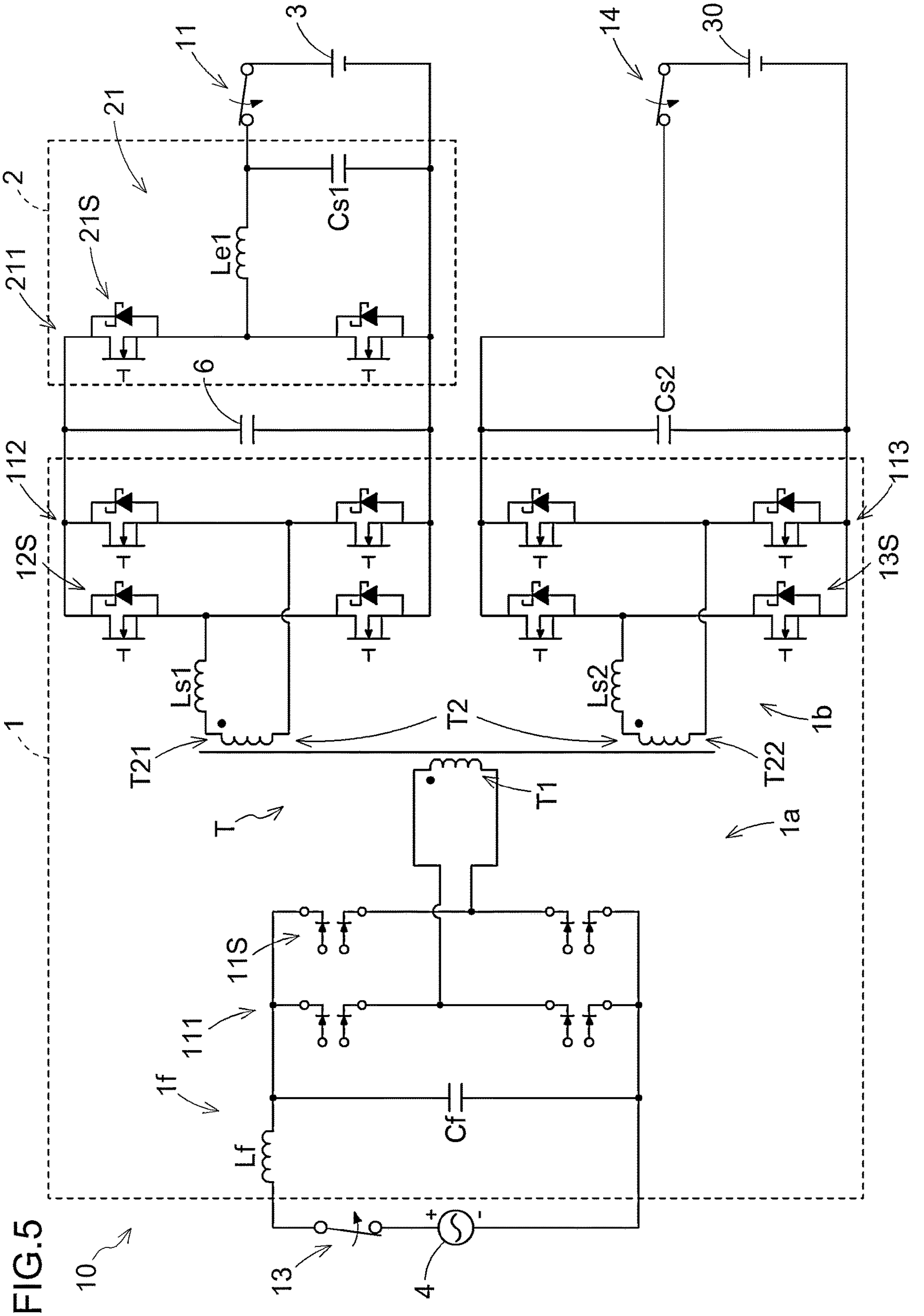
FIG. 5 is a circuit block diagram illustrating a fifth example of the in-vehicle charging device.

As compared with the in-vehicle charging device 10 of the first example, the in-vehicle charging device 10 of the fifth example illustrated in FIG. 5 further includes a chopper circuit (first chopper circuit 21) that includes a switching circuit (first switching circuit 211), a choke coil (first choke coil Le1), and an output capacitor (first output capacitor Cs1) and converts the first DC power into the third DC power. Similarly to the third example, the first DC link capacitor 6 is disposed at a portion where the first output capacitor Cs1 is disposed in the first example. It can be said that the in-vehicle charging device 10 of the fifth example is configured without including the second chopper circuit 22 in relation to the in-vehicle charging device 10 of the third example. The in-vehicle charging device 10 of the fifth example charges the first DC power supply 3 with the third DC power, and charges the second DC power supply 30 with the second DC power.

By providing the DC-DC converter 2 including the chopper circuit (for example, the first chopper circuit 21), it is possible to suppress the pulsation component in the third DC power as compared with the first DC power. In addition, the third DC power and the second DC power are both power on the secondary side of the transformer T. Since the primary-side coil T1 and the secondary-side first coil T21 are electromagnetically coupled to each other, and pulsation of the third DC power in the first chopper circuit 21 connected to the secondary-side first coil T21 is suppressed, pulsation of the DC power (second DC power) appearing in the secondary-side second coil T22 electromagnetically coupled to the primary-side coil T1 is also suppressed.

In the in-vehicle charging device 10 of the fifth example described above with reference to FIG. 5, a form has been exemplified in which the first DC power supply 3 is charged with the DC power subjected to the two-stage power conversion from the AC power via the AC-DC converter 1 and the DC-DC converter 2, and the second DC power supply 30 is charged with the DC power subjected to the one-stage power conversion from the AC power via only the AC-DC converter 1. However, although not illustrated, a form may be employed in which the second DC power supply 30 instead of the first DC power supply 3 is charged with DC power subjected to two-stage power conversion from AC power via the AC-DC converter 1 and the DC-DC converter 2, and the first DC power supply 3 is charged with DC power subjected to one-stage power conversion from AC power via only the AC-DC converter 1.

That is, in contrast to the form of the first example, the in-vehicle charging device 10 may further include a chopper circuit (second chopper circuit 22) that includes a switching circuit (second switching circuit 212), a choke coil (second choke coil Le2), and an output capacitor (second output capacitor Cs2) and converts the second DC power into the fourth DC power. Similarly to the third example, the second DC link capacitor 60 is disposed at a portion where the second output capacitor Cs2 is disposed in the first example. In relation to the form of the third example, it can be said that the first chopper circuit 21 is not provided. In this case, the in-vehicle charging device 10 charges the first DC power supply 3 with the first DC power, and charges the second DC power supply 30 with the fourth DC power.

As described above, the in-vehicle charging device 10 of the fifth example includes the chopper circuit (first chopper circuit 21 or second chopper circuit 22) that includes the switching circuit (first switching circuit 211 or second switching circuit 212), the choke coil (first choke coil Le1 or second choke coil Le2), and the output capacitor (first output capacitor Cs1 or second output capacitor Cs2) and converts the first DC power into the third DC power or converts the second DC power into the fourth DC power. In a case where the chopper circuit (first chopper circuit 21) converts the first DC power into the third DC power, the first DC power supply 3 is charged with the third DC power, and the second DC power supply 30 is charged with the second DC power. In a case where the chopper circuit (second chopper circuit 22) converts the second DC power into the fourth DC power, the first DC power supply 3 is charged with the first DC power, and the second DC power supply 30 is charged with the fourth DC power.

By providing the DC-DC converter 2 including the chopper circuit (first chopper circuit 21) between the AC-DC converter 1 and the first DC power supply 3, it is possible to suppress the pulsation component in the third DC power as compared with the first DC power. The third DC power and the second DC power are both power on the secondary side of the transformer T. Since the primary-side coil T1 and the secondary-side first coil T21 are electromagnetically coupled to each other, and pulsation of the third DC power in the first chopper circuit 21 connected to the secondary-side first coil T21 is suppressed, pulsation of the DC power (second DC power) appearing in the secondary-side second coil T22 electromagnetically coupled to the primary-side coil T1 is also suppressed. Similarly, by providing the DC-DC converter 2 including the chopper circuit (second chopper circuit 22) between the AC-DC converter 1 and the second DC power supply 30, it is possible to suppress the pulsation component in the fourth DC power as compared with the second DC power. The fourth DC power and the first DC power are both power on the secondary side of the transformer T. Since the primary-side coil T1 and the secondary-side first coil T21 are electromagnetically coupled to each other, and pulsation of the fourth DC power in the second chopper circuit 22 connected to the secondary-side second coil T22 is suppressed, pulsation of the DC power (first DC power) appearing in the secondary-side first coil T21 electromagnetically coupled to the primary-side coil T1 is also suppressed. That is, by providing the DC-DC converter 2 having the chopper circuit in either one of between the secondary-side first bridge circuit 112 and the first DC power supply 3 or between the secondary-side second bridge circuit 113 and the second DC power supply

30, it is possible to appropriately suppress the pulsation of the DC power for charging supplied to both the first DC power supply 3 and the second DC power supply 30.

Similarly to the relationship between the third example and the fourth example, in the fifth example as well, for example, as in the in-vehicle charging device 10 of a sixth example to be described later with reference to FIG. 6, a stator coil of a rotating electrical machine and an inverter that drives the rotating electrical machine can be used as a switching circuit and a choke coil constituting a chopper circuit. That is, in a case where a DC power supply charged via a chopper circuit (first chopper circuit 21 or second chopper circuit 22) among the first DC power supply 3 and the second DC power supply 30 is connected to a rotating electrical machine (first rotating electrical machine 70 or second rotating electrical machine 8M) including stator coils (first stator coils 7 or second stator coils 8) of multiple phases connected to each other at a neutral point (7N or 8N) via an inverter (first inverter 5 or second inverter 50) that converts power between a DC and an AC, the chopper circuit (first chopper circuit 21 or second chopper circuit 22) can include a switching circuit (first switching circuit 211 or second switching circuit 212) configured using the inverter (first inverter 5 or second inverter 50), a choke coil (first choke coil Le1 or second choke coil Le2) configured using stator coils of multiple phases (first stator coils 7 or second stator coils 8), and an output capacitor (first output capacitor Cs1 or second output capacitor Cs2) connected to a neutral point (7N or 8N) of the stator coils of multiple phases (first stator coils 7 or second stator coils 8).

Figure 6:
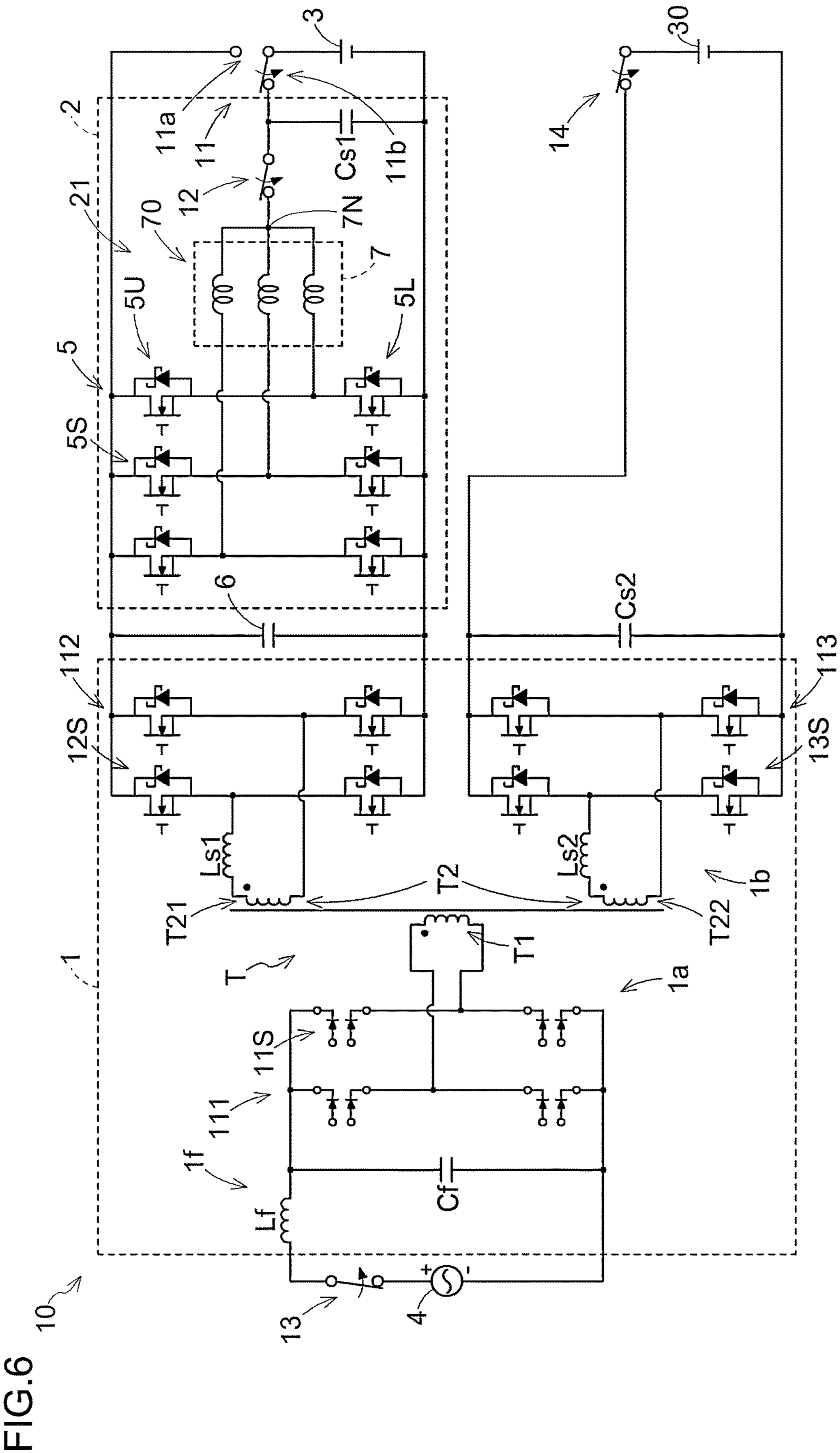
FIG. 6 is a circuit block diagram illustrating a sixth example of the in-vehicle charging device (an example of the in-vehicle charging device using a drive control system of a rotating electrical machine in the fifth example)

FIG. 6 illustrates a sixth example of the in-vehicle charging device 10. A form is illustrated in which the first DC power supply 3 charged via the first chopper circuit 21 is connected to the first rotating electrical machine 70 including the first stator coils 7 of multiple phases connected to each other at the neutral point 7N via the first inverter 5 that converts power between a DC and an AC, the first chopper circuit 21 includes the first switching circuit 211 configured using the first inverter 5, the first choke coil Le1 configured using the first stator coils 7 of multiple phases, and the first output capacitor Cs1 connected to the neutral point 7N of the first stator coils 7 of multiple phases. Details of the function switching method and the like are the same as those of the in-vehicle charging device 10 of the fourth example described above with reference to FIGS. 4 and 7, and thus detailed description is omitted.

Although not illustrated, similarly, in a case where the first DC power supply 3 charged via the second chopper circuit 22 is connected to the second rotating electrical machine 8M including the second stator coils 8 of multiple phases connected to each other at the neutral point 8N via the second inverter 50 that converts power between a DC and an AC, the second chopper circuit 22 may include the second switching circuit 212 configured using the second inverter 50, the second choke coil Le2 configured using the second stator coils 8 of multiple phases, and the second output capacitor Cs2 connected to the neutral point 8N of the second stator coils 8 of multiple phases.

That is, a DC power supply connected to the rotating electrical machine can be charged by using both coils included in the rotating electrical machine and an inverter for driving and controlling the rotating electrical machine. By using both of the coils and the inverter, the in-vehicle charging device 10 can be configured on a small scale.

By the way, in recent years, it has been proposed to use a DC power supply of an electric vehicle or a hybrid vehicle as an emergency power supply at the time of disaster or the like. The first chopper circuit 21 and the second chopper circuit 22 are bidirectional chopper circuits, and function as a buck converter from the AC-DC converter 1 toward the first DC power supply 3 and the second DC power supply 30, and function as a boost converter from the first DC power supply 3 and the second DC power supply 30 toward the AC-DC converter 1 (however, in this case, DC-AC conversion is performed.). As illustrated in FIG. 1 and the like, the AC-DC converter 1 includes the full-bridge circuit, so that the AC-DC converter 1 can function as a bidirectional power converter having not only a function of converting an AC to a DC but also a function of converting a DC to an AC. That is, DC-AC conversion is performed by the AC-DC converter 1, commercial AC power can be output from the AC-DC converter 1, and the first DC power supply 3 and the second DC power supply 30 can be used as emergency power supplies.

In a case where the in-vehicle charging device 10 charges the first DC power supply 3 and the second DC power supply 30 with the external AC power supply 4, the AC-DC converter 1 functions as an AC-DC TAB boost converter, and the DC-DC converter 2 functions as a DC-DC buck converter. In a case where the in-vehicle charging device 10 functions as an emergency AC power supply that outputs AC power by the power stored by the first DC power supply 3 and the second DC power supply 30, the DC-DC converter 2 functions as a DC-DC boost converter, and the AC-DC converter 1 functions as a DC-AC TAB buck converter.

As described above by exemplifying various aspects, according to the present embodiment, the in-vehicle charging device that charges the in-vehicle DC power supply with the power from the external AC power supply can be configured with suppressed system cost.

An in-vehicle charging device charges a first direct current (DC) power supply and a second DC power supply electrically isolated from the first DC power supply with power supplied from an external alternating current (AC) power supply. The in-vehicle charging device includes an AC-DC converter that converts power between AC power on the external AC power supply side and first DC power on the first DC power supply side, and converts power between AC power on the external AC power supply side and second DC power on the second DC power supply side, in which the AC-DC converter is a triple active bridge circuit including: a transformer including a primary-side coil, a secondary-side first coil, and a secondary-side second coil; a primary-side bridge circuit connected to the primary-side coil; a secondary-side first bridge circuit connected to the secondary-side first coil; and a secondary-side second bridge circuit connected to the secondary-side second coil, and the primary-side bridge circuit includes a bidirectional switching device.

With this configuration, since the AC-DC converter includes the transformer, it is possible to ensure insulation between the external AC power supply and the first DC power supply, between the external DC power supply and the second DC power supply, and between the first DC power supply and the second DC power supply. In this manner, the first DC power supply and the second DC power supply are charged by the first DC power and the second DC power converted by the AC-DC converter, respectively, without separately including a converter that converts power between a DC and a DC in a state where insulation is secured, so that the in-vehicle charging device can be configured on a small scale. In addition, since the primary-side bridge circuit includes the bidirectional switching device, switching control of the primary-side bridge circuit can be performed not by voltage control using a capacitor but by current control using an inductor. Since a capacitor having a large capacity tends to have a large size, it is easy to suppress an increase in size of the in-vehicle charging device. In addition, the bidirectional switching device easily realizes soft switching accompanied by zero current switching in which a current flowing through the switching device is zero at the time of switching. Therefore, the loss of the in-vehicle charging device can be easily reduced, and the system cost can be easily reduced. As described above, with this configuration, it is possible to provide an in-vehicle charging device that charges an in-vehicle DC power supply with power from an external AC power supply with suppressed system cost.

The in-vehicle charging device includes: a first chopper circuit that includes a first switching circuit, a first choke coil, and a first output capacitor, and converts the first DC power into third DC power; and a second chopper circuit that includes a second switching circuit, a second choke coil, and a second output capacitor, and converts the second DC power into fourth DC power. The first DC power supply is charged with the third DC power, and the second DC power supply is charged with the fourth DC power.

In the in-vehicle charging device, the first DC power supply is connected to a first rotating electrical machine via a first inverter, the first rotating electrical machine including a first stator coil of multiple phases connected to each other at a neutral point, the first inverter converting power between a DC and an AC. The second DC power supply is connected to a second rotating electrical machine via a second inverter, the second rotating electrical machine including a second stator coil of multiple phases connected to each other at a neutral point, the second inverter converting power between a DC and an AC. The first chopper circuit includes: the first switching circuit configured using the first inverter; the first choke coil configured using the first stator coil of multiple phases; and the first output capacitor connected to the neutral point of the first stator coil of multiple phases. The second chopper circuit includes: the second switching circuit configured using the second inverter; the second choke coil configured using the second stator coil of multiple phases; and the second output capacitor connected to the neutral point of the second stator coil of multiple phases.

The in-vehicle charging device includes a chopper circuit that includes a switching circuit, a choke coil, and an output capacitor and converts the first DC power into third DC power or converts the second DC power into fourth DC power. In a case where the chopper circuit converts the first DC power into the third DC power, the first DC power supply is charged with the third DC power, and the second DC power supply is charged with the second DC power, and in a case where the chopper circuit converts the second DC power into the fourth DC power, the first DC power supply is charged with the first DC power, and the second DC power supply is charged with the fourth DC power.

In the in-vehicle charging device, a DC power supply charged via the chopper circuit in the first DC power supply and the second DC power supply is connected to a rotating electrical machine via an inverter, the rotating electrical machine including a stator coil of multiple phases connected to each other at a neutral point, the inverter converting power between a DC and an AC. The chopper circuit includes: the switching circuit configured using the inverter; the choke coil configured using the stator coil of multiple phases; and the output capacitor connected to the neutral point of the stator coil of multiple phases.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An in-vehicle charging device that charges a first direct current (DC) power supply and a second DC power supply electrically isolated from the first DC power supply with power supplied from an external alternating current (AC) power supply, the in-vehicle charging device comprising:

an AC-DC converter that converts power between AC power on an external AC power supply side and first DC power on a first DC power supply side, and converts power between AC power on the external AC power supply side and second DC power on a second DC power supply side, wherein;

the AC-DC converter is a triple active bridge circuit including:

a transformer including a primary-side coil, a secondary-side first coil, and a secondary-side second coil;

a primary-side bridge circuit connected to the primary-side coil;

a secondary-side first bridge circuit connected to the secondary-side first coil; and a secondary-side second bridge circuit connected to the secondary-side second coil, the primary-side bridge circuit includes a bidirectional switching device, the in-vehicle charging device further comprises:

a first chopper circuit that includes a first switching circuit, a first choke coil, and a first output capacitor, and converts the first DC power into third DC power; and a second chopper circuit that includes a second switching circuit, a second choke coil, and a second output capacitor, and converts the second DC power into fourth DC power, the first DC power supply is charged with the third DC power, the second DC power supply is charged with the fourth DC power, the first DC power supply is connected to a first rotating electrical machine via a first inverter, the first rotating electrical machine including a first stator coil of multiple phases connected to each other at a neutral point, the first inverter converting power between a DC and an AC, the second DC power supply is connected to a second rotating electrical machine via a second inverter, the second rotating electrical machine including a second stator coil of multiple phases connected to each other at a neutral point, the second inverter converting power between a DC and an AC, the first chopper circuit includes:

the first switching circuit configured using the first inverter;

the first choke coil configured using the first stator coil of multiple phases; and the first output capacitor connected to the neutral point of the first stator coil of multiple phases, and the second chopper circuit includes:

the second switching circuit configured using the second inverter;

the second choke coil configured using the second stator coil of multiple phases; and the second output capacitor connected to the neutral point of the second stator coil of multiple phases.

2. An in-vehicle charging device that charges a first direct current (DC) power supply and a second DC power supply electrically isolated from the first DC power supply with power supplied from an external alternating current (AC) power supply, the in-vehicle charging device comprising:

an AC-DC converter that converts power between AC power on an external AC power supply side and first DC power on a first DC power supply side, and converts power between AC power on the external AC power supply side and second DC power on a second DC power supply side, wherein:

the AC-DC converter is a triple active bridge circuit including:

a transformer including a primary-side coil, a secondary-side first coil, and a secondary-side second coil;

a primary-side bridge circuit connected to the primary-side coil;

a secondary-side first bridge circuit connected to the secondary-side first coil; and a secondary-side second bridge circuit connected to the secondary-side second coil, the primary-side bridge circuit includes a bidirectional switching device, the in-vehicle charging device further comprises:

a chopper circuit that includes a switching circuit, a choke coil, and an output capacitor and converts the first DC power into third DC power or converts the second DC power into fourth DC power, in a case where the chopper circuit converts the first DC power into the third DC power, the first DC power supply is charged with the third DC power, and the second DC power supply is charged with the second DC power, in a case where the chopper circuit converts the second DC power into the fourth DC power, the first DC power supply is charged with the first DC power, and the second DC power supply is charged with the fourth DC power, a DC power supply charged via the chopper circuit in the first DC power supply and the second DC power supply is connected to a rotating electrical machine via an inverter, the rotating electrical machine including a stator coil of multiple phases connected to each other at a neutral point, the inverter converting power between a DC and an AC, and the chopper circuit includes:

the switching circuit configured using the inverter;

the choke coil configured using the stator coil of multiple phases; and the output capacitor connected to the neutral point of the stator coil of multiple phases.

* * * * *